United States Patent [19]

Syrinek et al.

[11] Patent Number: 4,781,845

[45] Date of Patent: Nov. 1, 1988

[54] HYDROCARBON GELLANT

[75] Inventors: Allen R. Syrinek, Richmond; David A. Huddleston, Sugar Land, both of Tex.

[73] Assignee: Nalco Chemical Company, Naperville, Ill.

[21] Appl. No.: 85,735

[22] Filed: Aug. 17, 1987

[51] Int. Cl.$^4$ .......................... E21B 43/26; F17D 1/16
[52] U.S. Cl. ................................. 252/8.551; 137/13; 252/315.1
[58] Field of Search .............. 252/8.551, 8.515, 315.1; 137/13

[56] References Cited

U.S. PATENT DOCUMENTS

| | | | |
|---|---|---|---|
| 3,757,864 | 9/1973 | Crawford et al. | 252/8.551 X |
| 4,104,173 | 8/1978 | Gay et al. | 252/8.551 |
| 4,152,289 | 5/1979 | Griffin | 252/315.1 |
| 4,174,283 | 11/1979 | Griffin | 252/8.551 |
| 4,316,810 | 2/1982 | Burnham | 252/8.551 |

*Primary Examiner*—Herbert B. Guynn
*Attorney, Agent, or Firm*—Kinzer, Plyer, Dorn, McEachran & Jambor

[57] ABSTRACT

Gellant for oil well fraturing or friction reducer in pipelines in liquid form comprising (A) an ionic association polymer which is the reaction product of (1) sodium aluminate and (2) an alkyl phosphate ester combined with (B) a polar solvent.

2 Claims, 1 Drawing Sheet

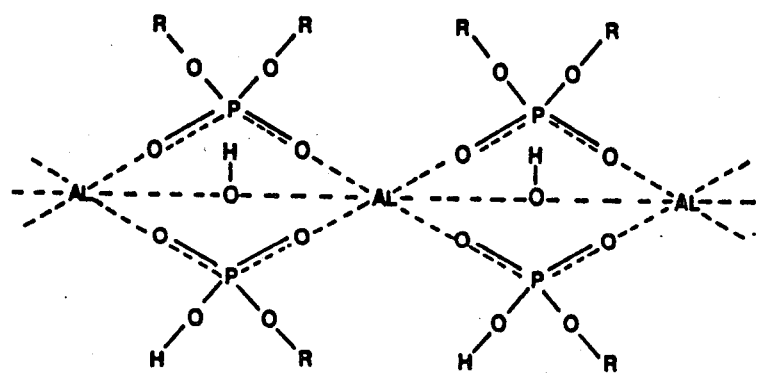

HYDROCARBON GELLANT

BACKGROUND OF THE INVENTION

This invention relates to a composition which may be employed as a hydrocarbon gellant in fracturing a subterranean hydrocarbon producing formation or as a friction reducer when pumping crude oil or other hydrocarbon liquid through a long pipeline.

PRIOR ART

It is known to fracture subterranean hydrocarbon producing formations by employing a slurry of sand or other proppant and gelled hydrocarbon, pumped down the well hole and into the producing zone. The slurry is forced into cracks in the formation, whereby the proppant will support the cracks, propping them open to aid in the flow of petroleum therefrom to the collection point. The gelled hydrocarbon is a carrier for the proppant.

There are at least two precursors for preparing the gellant: an alkyl phosphate ester (sometimes termed an alkyl phosphate diester) and sodium aluminate in water solution. The sodium aluminate is an activator which supplies aluminum ions and pH adjustment. Other sources of aluminum and pH adjustment are known. The two are added to the hydrocarbon oil at the well site to form a complex, long chain ionic association polymer which simultaneously gels the hydrocarbon oil. The gelled hydrocarbon is then slurried with the proppant, and this slurry is pumped down the well for fracturing purposes.

The alkyl phosphate ester is prepared by known methods; see U.S. Pat. No. 4,152,289 for example. We are not concerned with any novelty in production of this ester. Our concern is to avoid the necessity of having to form the gellant at the wellhead by combining the ester, an aluminum source, and pH adjustment.

The Objectives of the Invention

Currently, sodium aluminate (or other sources of aluminum and pH adjustment) and alkyl phosphate esters are mixed in the oil field before being used to viscosify (gel) the fracturing oil. Under the present invention we combine sodium aluminate (or its equivalent) and alkyl phosphate esters as a single solution or combinate liquid which can be used as the oil viscosifier or friction reducer. The major advantages are the ease of handling this product as an entity rather than two components at the producing zone, and assurance of the proper ratio of aluminum to phosphate ester for maximum viscosity development.

Under the present invention, as another object, we have found a way to disrupt the association polymer by which shorter chains are formed, making possible a concentrated liquid which is to be added to the hydrocarbon oil to gel it. The present product is stable, easier to handle compared to the two precursors separately, and requires fewer people and less equipment when employed as a gellant at the wellhead, constituting additional objects of the invention.

The Drawing

The drawing shows the association polymer with which the present invention is concerned.

GENERAL DESCRIPTION

The gellant of the present invention, like the known gellant, is an alkyl phosphate ester combined with sodium aluminate to form an ionic association polymer. It differs, however, in that we combine the ester and the activator in the presence of a polar solvent to disrupt the association polymer thereby to provide a liquid concentrate. Thus, the polar solvent assures a short chain association polymer, making possible a gellant which is a pourable liquid.

A precise viscosity value is not critical. The point is that the gellant is a pourable liquid at use temperatures in the range of 10°–130° F. Testing also established that friction reduction character is acceptable.

The procedures are simple mixing procedures, since the present disclosure assumes the alkyl phosphate ester has already been prepared. That being so, the solvent is added to the ester, and then the activator is added slowly with agitation; agitation is continued until the viscosity stabilizes, which may require an hour or so. The result is the product of commerce.

In the examples to follow, two esters were employed: ester "60" and ester "62" which differ only in that "62" has a higher molecular weight than the other.

The strength of the activator is not critical. We can use a water solution of sodium aluminate at a strength of about 40.5% solids by weight, which is typical of past practice when employing the activator in the field to make a hydrocarbon gellant.

The solvent identified as HOF-10 is a $C_{10}$ fatty alcohol distillation residue having a boiling point of about 250° C. It is light yellow to yellowish brown in color and has a specific gravity of 0.862, OH−No. 90, SAP No. 50, weight percent acetic 0.07 and carboxyl 0.5. Chemically it is 57–73 weight percent primary branched chain $C_{10}$–$C_{22}$ alcohols (classed as fatty alcohols) and 29–41 weight percent of mixed long chain esters and ethers ($C_{18}$–$C_{33}$ ester; $C_{18}$–$C_{22}$ ether).

Amounts are in grams. The amount of activator is grams of active sodium aluminate solids regardless of solution volume.

| Example | Embodiments | | Solvent Amount | Amount of Activator |
|---|---|---|---|---|
|  | Amount of Ester "62" |  |  |  |
| 1 | 14.63 | HOF-10 | 70 | 1.17 |
| 2 | 14.87 | HOF-10 | 65 | 1.18 |
|   |       | Isopropanol | 20 |   |
| 3 | 19.64 | HOF-10 | 40 | 1.55 |
|   |       | Isopropanol | 15 |   |
|  | Amount of Ester "60" |  |  |  |
| 4 | 10.2 | HOF-10 | 90 | 1.02 |
| 5 | 10.2 | Heavy Aromatic Naphtha* | 42.5 | 0.53 |
|   |       | Isopropanol | 7.5 |   |
| 6 | 15.3 | HOF-10 | 85 | 1.55 |

*Exxon 150; boiling range 176–210° C.

The gellant can thus be made at a site remote from the wellhead or fracturing zone. The gellant is added to the hydrocarbon oil to be gelled and a good example is six gallons per 1000 gallons of hydrocarbon oil to be gelled. The gelled oil is then slurried with the proppant, say in the proportion of 2 to 6 pounds of proppant per gallon of gelled oil. This slurry is then pumped into the producing zone.

The solvents, or solvent combinations, successfully employed in achieving reasonably good concentrations of the alumino alkyl phosphate esters would be classed as polar and are inexpensive. We tested our theory of success (explained below) by employing solvents classed as nonpolar solvents, such solvents being kerosene, toluene and low odor paraffinic solvents. Only small percentages of the ionic association polymer (1 to 3 percent by weight) could be dissolved before the solution thickened to the point of impracticality.

We reason that successful solution of achieving reasonably high concontrations (10 to 15 percent by weight) is because the association polymer is ionic. Therefore, polar solvents should allow a high concentration of alumino alkyl phosphate esters by disrupting the ionic complex. Example 3 helps prove the point. Isopropanol is one of the most polar of alcohols; when present, it greatly reduces the viscosity as can be seen by comparing Examples 1, 2 and 3.

The high boiling point aromatic naphtha is weakly polar and when employed by itself (100 grams) dissolved a mere one percent by weight of the "60" ester. That solution was too thick to be practical; even when the same amount of the aromatic naphtha was combined with five percent by weight isopropanol (strongly polar) a pourable product could be achieved with only a 1.9 percent concentration of the association polymer. However, when the naphtha was combined with a larger amount of isopropanol, a practical product resulted, Example 5.

The heavy aromatic naphtha and HOF-10 are inexpensive and as noted above this naphtha was rendered more polar by combining it with isopropanol. HOF-10 is polar by itself. There are doubtless other polar solvents (or polar combinations) which fit the class and therefore may be used as equivalents for achieving at least a 10 percent by weight concentration of the association polymer, consistent with our conclusion that because the association polymer is polar only a polar solvent is capable of achieving a liquid combination with a practical concentration of the association polymer capable of gelling a hydrocarbon oil. The high boiling point naphtha is also known as painter's naphtha, V.M. & P. naphtha, petroleum spirits and mineral spirits, available as such on the market. Hence, other embodiments of the invention are possible within the purview of the specification and the appended claims using other polar solvents and equivalents of sodium aluminate as a source of aluminum and for pH adjustment.

We claim:

1. A liquid which may be used to gel a hydrocarbon oil employed in fracturing a subterranean hydrocarbon producing formation, or to reduce friction when pumping a liquid through a pipeline comprising at least about 10% by weight of (A) an ionic association polymer which is the reaction product of (1) sodium aluminate and (2) an alkyl phosphate ester; and the balance being (B) a polar solvent selected from the group consisting of (1) high boiling point aromatic naphtha combined with ispropanol, (2) the distillation residue of $C_{10}$ fatty alcohol and (3) the distillation residue of $C_{10}$ fatty alcohol combined with isopropanol.

2. A method of fracturing a subterranean hydrocarbon producing formation comprising preparing the composition of claim 1 at a site remote from the wellhead, mixing said composition with a hydrocarbon oil to gel the hydrocarbon oil, making a slurry of the gelled hydrocarbon and proppant, and pumping the slurry into the producing zone.

* * * * *